Feb. 15, 1944.  A. N. GRAY  2,341,712
METHOD OF MAKING CABLE
Filed Sept. 13, 1940
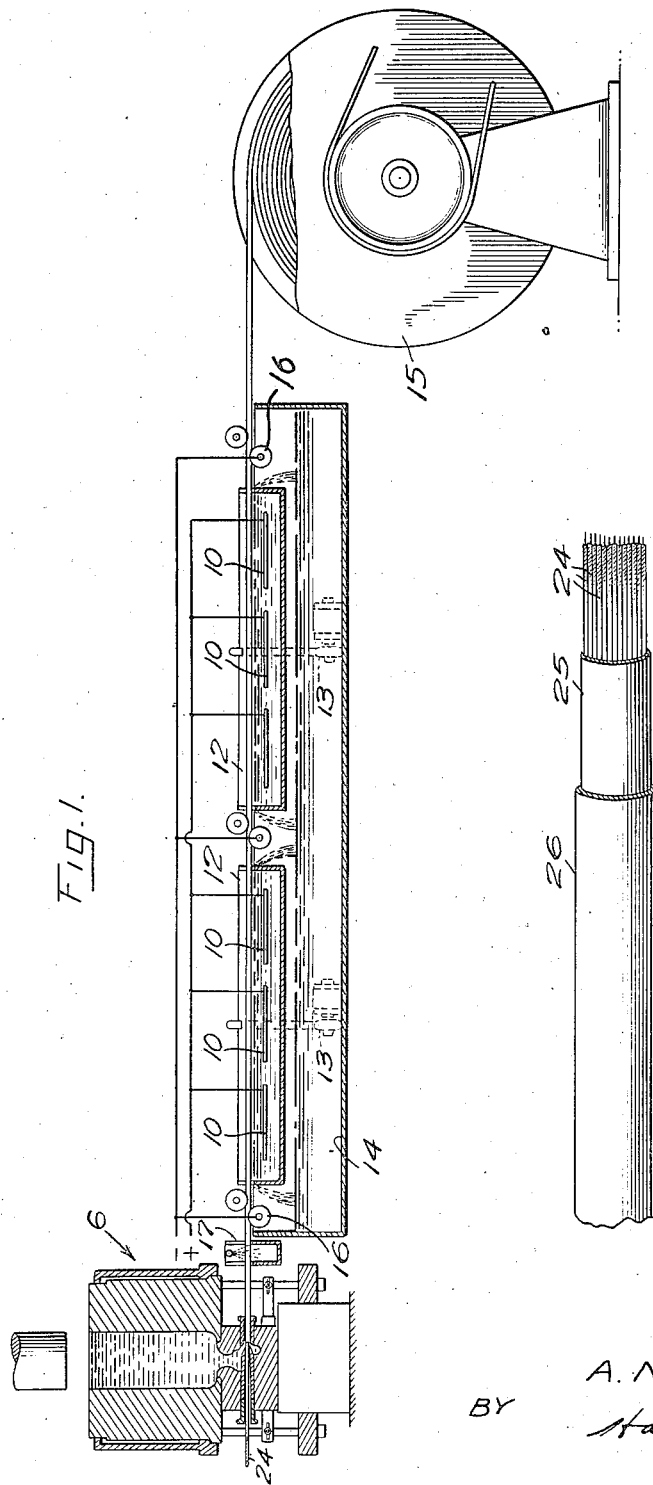
INVENTOR
A. N. GRAY
BY
Harry L. Duft
ATTORNEY Patented Feb. 15, 1944

2,341,712

UNITED STATES PATENT OFFICE 2,341,712

METHOD OF MAKING CABLE

Alvin N. Gray, Joppa, Md., assignor to Western Electric Company, Incorporated, New York, N. Y., a corporation of New York Application September 13, 1940, Serial No. 356,618

1 Claim. (Cl. 204—38)

This invention relates to a lead sheathed cable having an adherent covering of vulcanizable material and a method of making such a cable.

In applying a rubber sheath over a cable it is desirable that the rubber covering should adhere firmly to the cable.

Objects of the invention are to provide an effective and adherent covering of vulcanizable material on lead sheathed cable and method of making such a cable.

In accordance with one embodiment of the invention a brass plate is applied to a lead covered cable as the cable issues from a lead extrusion press and thereafter the cable is passed into a continuous rubber extruding and vulcanizing apparatus to provide an adherent rubber covering over the cable.

A complete understanding of the invention may be had by reference to the following description taken in conjunction with the accompanying drawing, in which Fig. 1 is a side elevation of an apparatus embodying the invention and by means of which the method of the invention may be practised; and Fig. 2 is a fragmentary detail view of a lead sheathed rubber covered cable made in accordance with the invention.

Referring now more in detail to the drawing, a lead extrusion apparatus 6 is shown for applying a lead sheath to a conductor core or cable 24. As is well known in the art, molten lead is supplied to the cylinder of the lead extrusion apparatus and is allowed to cool and solidify. The hot plastic lead may then be extruded over the conductor core. The lead sheathed cable coming from the lead extrusion apparatus is too hot to pass directly into a brass plating bath for the particular plating bath used and consequently the sheath should be cooled somewhat before it enters the plating bath. A tank 17 is shown in which a cooling fluid, preferably water, is sprayed over the sheath to cool it to a temperature in the neighborhood of 100° F. From the cooling means the cable is passed directly through one or more electroplating tanks 12 provided with the usual weirs at their ends, and the plating solution is continuously pumped into the tanks 12 by pumps 13 from a tank 14 in which the overflow from tanks 12 is collected. In each of the plating tanks 12 are a plurality of brass electrodes 10 which are made the anodes in the electrolytic bath, and the cable serves as a cathode to which electrical contact is made by grooved rollers 16.

For the purpose of promoting adhesion between a lead sheathing of the cable and a rubber covering which is to be subsequently applied, it has been found to be preferable to apply a thin or flash brass plate which comprises approximately 75% of copper and 25% of zinc. Such a coating may be obtained by using brass anodes and an electrolyte comprising from 6½ to 7½ ounces of copper as copper cyanide per gallon of electrolyte, 0.9 to 1.1 ounces of zinc as zinc cyanide per gallon of electrolyte, 3 to 5 ounces of free sodium cyanide per gallon of electrolyte, together with a sufficient qauntity of sodium hydroxide to maintain the pH value of the solution between 10.6 and 11.3 when measured by a glass electrometer. If the temperature of the cable is considerably higher than 100° F. when entering the plating bath, a higher percentage of zinc cyanide should be used for obtaining the stated amount of zinc in the brass coating. In this electrolyte the cable is subjected to a direct current of from 20 to 40 amperes per square foot. A suitable flash coating for the desired adhesion of the subsequently applied rubber covering may be applied by immersing approximately 56 feet of the cable in the electrolyte and moving the cable at a speed of approximately 150 feet per minute. The brass plate may be applied readily and firmly to the lead sheath because the condition of the lead sheath immediately upon issuance from the lead extrusion apparatus is such as to render it readily receptive to a firmly adherent coating. This appears to be due in part to the fact that the lead is freshly extruded and heated interiorly, which enhances electroplating and also it is difficult to avoid contamination if the cable is handled and reeled before the brass plate is applied.

During the period that the cylinder of the lead extrusion apparatus is being recharged with lead, which requires in the neighborhood of seven minutes, the electroplating current may be discontinued and then turned on again shortly before extrusion is resumed so that any plating that may be dissolved from the wire during this period may be replated and thus a uniform coating will result.

Lead sheath when hot or wet oxidizes readily in the atmosphere and any oxide formed would require removal before electroplating. It is also customary to lubricate a lead sheathed cable before placing it on a reel in order to facilitate removal of the cable since otherwise the friction in unreeling is apt to produce kinks in the cable. The immediate brass plating upon extrusion therefore produces a firmly adherent and effective coating in a convenient and economical process.

After leaving the electroplating bath the cable may be passed through a water rinsing and drying apparatus (not shown) whereupon the cable may be wound upon a reel 15. The cable with the thin or flash brass plate is then ready to be passed through a continuous rubber extrusion and vulcanizing apparatus to have a continuous rubber covering extruded and adherently vulcanized to the brass plated lead sheath. The details of the rubber extrusion and vulcanizing apparatus need not be disclosed herein since they are fully disclosed in the patent to L. F. Lamplough No. 1,689,206, October 30, 1928.

Fig. 2 discloses a cable of the type referred to herein, comprising a plurality of insulated conductors 24 which may be twisted or stranded together and have a lead sheath 25 to which a brass plate is applied as described above. The outer rubber covering 26, when applied as disclosed above, adheres firmly to the brass plate.

It will be understood that the nature and embodiment of the invention herein disclosed is merely illustrative and that many changes and modifications may be made therein without departing from the spirit and scope of the invention.

What is claimed is:

A method of making a cable, which comprises extruding a lead sheath around a cable core, thereafter cooling said lead sheath to about 100° F., and then directly passing the cooled lead sheathed cable through a brass plating bath to form a brass plate thereon as the cable moves continuously from the extruding operation.

ALVIN N. GRAY.